United States Patent [19]

Jettmar et al.

[11] Patent Number: 4,462,832
[45] Date of Patent: Jul. 31, 1984

[54] LESS ABRASIVE PIGMENT OR PRINTING INK, AND METHOD OF REDUCING ABRASION CAUSED BY PIGMENTS AND PRINTING INKS

[75] Inventors: Werner Jettmar, Mannheim; Hans Olschner, Weinheim; Helmut Junge, Wachenheim, all of Fed. Rep. of Germany

[73] Assignee: BASF Aktiengesellschaft, Ludwigshafen, Fed. Rep. of Germany

[21] Appl. No.: 325,551

[22] Filed: Nov. 27, 1981

[30] Foreign Application Priority Data

Dec. 19, 1980 [DE] Fed. Rep. of Germany ....... 3047999

[51] Int. Cl.³ ............................................. C09D 11/02
[52] U.S. Cl. .................................. 106/23; 106/288 B; 106/308 B; 106/308 Q
[58] Field of Search ................... 106/23, 288 B, 308 B, 106/308 Q, 20, 19

[56] References Cited

U.S. PATENT DOCUMENTS

| | | | |
|---|---|---|---|
| 1,906,962 | 5/1933 | Heckel | 106/20 |
| 2,111,981 | 9/1935 | Liebetruth | 106/20 |
| 2,139,068 | 12/1938 | Bourdon | 106/20 |
| 2,767,289 | 10/1956 | Robinson | 106/20 |
| 2,876,119 | 3/1959 | Dithmar et al. | 106/20 |
| 3,582,380 | 6/1971 | Hamilton | 106/20 |
| 3,615,749 | 10/1971 | Cramer et al. | 106/20 |
| 3,616,145 | 10/1971 | Clifton | 428/242 |
| 3,623,908 | 11/1971 | Hermann et al. | 427/127 |

*Primary Examiner*—John Kight, III
*Assistant Examiner*—Amelia B. Yarbrough
*Attorney, Agent, or Firm*—Oblon, Fisher, Spivak, McClelland & Maier

[57] ABSTRACT

The abrasiveness of a pigment or printing ink is reduced by incorporation of one or more finely divided substances which are insoluble in printing inks and have a Mohs hardness of from 4.5 to 8, suitable compounds being iron powder, compounds of iron, zirconium, silicon and magnesium, aluminum silicates, oxides of manganese, tin and cerium, or mixtures of these. The printing inks obtained cause substantially less, or virtually no, abrasion of gravure printing cylinders.

3 Claims, No Drawings

LESS ABRASIVE PIGMENT OR PRINTING INK, AND METHOD OF REDUCING ABRASION CAUSED BY PIGMENTS AND PRINTING INKS

The present invention relates to a pigment or printing ink which causes less abrasion of printing forms, and to a method of reducing the abrasion of printing cylinders by pigments and printing inks.

Wear of printing cylinders is an ever-present problem in gravure printing. As speeds of gravure printing presses, and lengths of print runs, have increased, so this problem has progressively become more prominent.

Destruction of chromium, and abrasion of chromium on gravure printing cylinders, means premature wear or even destruction of the protective chromium layer of the cylinders, before a print order has been completed; this can cause considerable problems and breakdowns in print production and entail substantial losses.

According to Scheidt (quoted in Aust: "Chromverschleiß auf Tiefdruckzylindern" in "Chromzerstörung, Chromverschleiß", Bundesverband Druck E. V., Technology+Research Division, Gravure Printing Section, 1979, page 7), destruction of the chroming of printing cylinders is a cumulative effect, in which the factors involved also influence the wear characteristics. The principal parameters involved are the printing ink, the printing form and the printing press.

According to Aust (loc. cit., pages 7 and 26 et seq.) it is particularly pigments which influence abrasion; accordingly, the printing ink is the principal factor in chromium wear. Moreover, the particle size and size distribution of the pigments matter, as do the method of preparation and overall composition of a printing ink.

According to Stammen ("Beitrag zum Thema Chromverschleiß/Chromzerstörung aus der Sicht der Tiefdruckfarbenhersteller" in "Chromzerstörung, Chromverschleiß", Bundesverband Druck E. V., Technology+Research Division, Gravure Printing Section, 1979, page 29 et seq.), the hardness of the pigments and fillers, which substantially depends on the crystal structure, is responsible for the abrasive effect of a printing ink. Such inks, according to Stammen, have a genuine abrading action and "naturally lead to premature abrasion of the chromium, even if all other factors which influence wear have been optimized".

It is an object of the present invention to provide a process, and means, whereby abrasion caused by printing inks and pigments can be prevented or at least substantially reduced.

We have found that this object is achieved and that, surprisingly, abrasion caused by pigments and printing inks is reduced or virtually prevented if substances which are insoluble in printing inks and have a Mohs hardness of from about 4.5 to 8 are added, in a finely divided form, to the pigments or printing inks.

Accordingly, the present invention relates to a pigment or printing ink which is less abrasive to printing forms (printing cylinders), wherein the improvement is due to the fact that the pigment or printing ink contains from 0.01 to 10% by weight, based on pigment, of one or more finely divided substances which are insoluble in printing inks and have a Mohs hardness of from about 4.5 to 8.

Since many of the suitable agents are known to serve as abrasives and polishing agents for glass and metals, the result of incorporating them into printing inks was the more surprising and in no way foreseeable.

Examples of suitable substances which are insoluble in printing inks and have a Mohs hardness of from about 4.5 to 8 are iron powders, compounds of iron, zirconium, silicon and magnesium, aluminum silicates, oxides of manganese, tin and cerium, and mixtures of these.

More specifically, examples of suitable substances are iron powder, especially carbonyl iron powder, iron silicates, zirconium silicates, aluminum silicates and mixed silicates of these metals, alkali metal or alkaline earth metal aluminosilicates, alkaline earth metal silicates, hydrated alkali metal/alkaline earth metal aluminosilicates, silicon dioxide, cerium oxide, tin oxide, manganese dioxide, iron oxides and mixtures of these substances.

Particular examples of suitable compounds of iron and zirconium are $Fe_2O_3$, the iron oxide obtained by combustion of iron pentacarbonyl, iron silicates, zirconium silicates and especially zirconium oxides of various origins.

Examples of suitable alkali metal/alkaline earth metal aluminosilicates are spars, for example potassium, sodium and calcium feldspar, whilst examples of suitable alkaline earth metal silicates are forsterite and steatite. Pumice is an example of a suitable hydrated alkali metal/alkaline earth metal aluminosilicate.

Silicon dioxide may be used as, for example, flint or cristobalite.

The following have proved particularly effective: iron oxide obtained by combustion of iron pentacarbonyl, iron powder obtained from iron pentacarbonyl (ie. carbonyl iron powder), zirconium silicates, zirconium oxides, compounds of various compositions obtained from zirconium oxide and silicon dioxide, silicon dioxide, pumice, feldspar, steatite, flint and mixtures of these.

The following are very particularly effective: pumice, feldspar, carbonyl iron powder and zirconium oxides which are obtained by processing naturally occurring baddeleyite or by digesting zirconium-containing minerals, such as zircon, malacon, baddeleyite, zirkite, endialyte or mixtures of these. Amongst these, the zirconium oxide obtained from baddeleyite is very particularly preferred.

The substances to be employed according to the invention are used in a finely divided form, the particle size being advantageously less than 55 μm and preferably from 0.1 to 20 μm. Where necessary, simple experiments may be used to establish what particle size range produces the best effect in the pigment or printing ink which is to be improved.

For example, when zirconium oxide obtained from naturally occurring baddeleyite is used, the difference in effect produced with particle sizes of up to 5 μm, of 5–20 μm and of 20–53 μm proved insignificant.

The amount of insoluble substance to use depends on the abrasive character of the pigments in the printing ink, or the abrasive character of the ink. If abrasion is severe, more of the substances to be employed according to the invention is added than if the abrasion is slight.

The amount of the insoluble substance employed is in general from about 0.01 to 10, preferably from 0.05 to 5, especially from 0.1 to 4, % by weight, based on pigment.

The amount of insoluble substances to be added to a given pigment or a given printing ink can be determined in an abrasion tester (cf. Aust, loc. cit.). Using this apparatus, it is easy to ascertain whether the substances intended to reduce abrasion are appropriate for the particular pigment or printing ink, and whether their effect is adequate.

The abrasion-reducing or abrasion-preventing substances can be mixed into the pigment or the finished printing ink, or be added during preparation of the printing ink.

In the case of pigments, the substances in question can also be added during formulation, for example when milling or blending the pigments, or when adding fillers.

The insoluble substances to be used according to the invention can also be added during finishing of the pigments or even during synthesis of the crude pigment, unless these processes employ media in which the abrasion-preventing substances are soluble or suffer chemical modification.

Advantageously, the substances to be used according to the invention are added to the pigments before final milling, whilst in the case of the preparation of printing inks the substances are incorporated, together with the pigment, into the binder solution.

The abrasion-preventing substances can be employed in the form of powders or of fluid or pasty formulations which contain solvents, with or without printing ink binders and/or other assistants conventionally used in gravure printing inks. Examples of the latter are wetting agents, lubricants, anti-settling agents, viscosity modifiers, and agents for modifying the rub resistance or the gloss.

Moreover, our experiments have shown that in the presence of substances having a Mohs hardness of <4.5, the amount of the substances to be used according to the invention and having a Mohs hardness of from 4.5 to 8 can be reduced, since, in such cases, there is a synergistic interaction between the two substances. For example, in a printing ink which when tested in an AT II abrasion tester gave a maximum abrasion of 4 $\mu$m (measuring point 2) the addition of 3% by weight of bentonite ($Al_2(OH)_2Si_4O_{10}$; Mohs hardness 1) reduced the abrasion only slightly, to 3.8 $\mu$m. However, the addition of 0.25% by weight of a zirconium oxide (99% pure $ZrO_2$, monoclinic form; "Tego BC 99 S" from T. H. Goldschmidt AG; Mohs hardness 6.5) to the same printing ink reduced the abrasion to 0.81 $\mu$m. If then 3% of bentonite was added to the printing ink, so as to give an ink containing 3% by weight of bentonite and 0.25% by weight of the above zirconium oxide, the maximum abrasion was reduced to 0.08 $\mu$m.

Suitable pigments are the inorganic and organic pigments conventionally used in printing inks, especially in gravure inks.

Examples of suitable organic pigments are metal-free phthalocyanines, copper phthalocyanines, polychloro-copper phthalocyanines, polychloro-bromo-copper phthalocyanines and azo pigments, $\beta$-copper phthalocyanine pigments being particularly preferred.

Examples of suitable inorganic pigments are carbon black, iron oxides, zinc sulfide, titanium dioxide (anatase), lead chromates and lead molybdates.

The process according to the invention, and the substances to be added according to the invention, can however improve the abrasion characteristics of only those printing inks and pigments in which abrasion is caused by particles which are not substantially harder than the chromium layer of the printing plate or cylinder. For example, the massive abrasion caused by aluminum oxide in the form of corundum, or by substances of similar or even greater hardness, cannot be influenced substantially, if at all, by addition of the substances according to the invention.

The Examples which follow, and in which parts and percentages are by weight, illustrate the invention.

A. DETERMINATION OF THE ABRASION CAUSED BY THE PRINTING INK OR BY THE PIGMENT IN THE INK

The abrasion caused by printing inks was determined by means of the AT II abrasion tester developed by Burda, Offenburg, and manufactured and sold by Schröder, Weinheim.

(A1) Preparation of the test ink:

(1.1) 270 g of a 35% strength solution of a rosin-modified phenolic resin in toluene, 36 g of the pigment to be tested and 300 g of steel balls (3 mm $\phi$) are weighed into a glass or polyethylene vessel, the vessel is closed and the pigment is dispersed for 30 minutes on a vibratory mill.

Agitated ball mills, roll mills, high-speed stirrers and similar equipment which produces the requisite fine dispersion of the pigment in the printing ink can also be used.

(1.2) After dispersion, 230 g of the color concentrate are diluted with an equal amount by weight of a 35% strength solution, in toluene, of the same resin or some other natural or synthetic resin compatible with the color concentrate (for example a hydrocarbon resin). The printing ink is then diluted with solvent to bring it to a viscosity corresponding to 28 sec flow time from a DIN cup with 3 mm nozzle.

(1.3) A 35% strength by weight zinc resinate or calcium resinate solution in a toluene/gasoline mixture can also be used for dilution.

(A2) Abrasion test:

To test the abrasion, 450 g of printing ink are subjected to $2.10^6$ knife contacts ($=5.10^5$ revolutions, each entailing 4 MDC coating knives) in an AT II abrasion tester (Schröder Meβtechnik, Weinheim) under a knife pressure of 300 p/cm ($\triangleq \approx 50$ kp/cm$^2$). The printing ink is kept at 20° C. by means of a thermostat. The knives used are MDC step-facet knives. The change in the approximately 6 $\mu$m thick chromium layer is then measured, in the most sensitive screen zone (screen depth $\approx 20$ $\mu$m; measuring point 2), using the Couloscop S 8 from Fischer, Sindelfingen, and the value found is recorded as the maximum abrasion in $\mu$m. The precision of the measurements, corrected according to M. Aust (Druckwelt 1978, No. 9, page 466), at 20 $\mu$m depth of etch (screen depth), is about 0.3 $\mu$m, which agrees with data in the literature (Aust and Braschoss "Der Polygraph", 21-80, page 1,885).

Accordingly, printing inks giving a maximum abrasion of $\leq 0.3$ $\mu$m are described as good, those giving abrasions of from $>0.3$ $\mu$m to 0.6 $\mu$m are classified as satisfactory and those giving an abrasion of $>0.6$ $\mu$m as of doubtful suitability for relatively long runs.

B. EXAMPLES

EXAMPLE 1

(a) 100 parts of a $\beta$-copper phthalocyanine pigment suitable for gravure printing inks and 3 parts of a zirconium oxide (90% of $ZrO_2$ and 8% of $SiO_2$; Mohs hardness 6.5; monoclinic, particle size $\approx 4$ $\mu$m; "Zedox T" from Anzon Ltd.) were homogeneously dry-blended.

(b) A gravure ink (b1) was prepared with the resulting mixture, using the procedure described in (A 1.1)

and (A 1.2). For comparison, a gravure printing ink (b2) was also prepared with only the β-copper phthalocyanine used in (a).

Both printing inks were tested for abrasive properties as described in (A2).

Abrasion by printing ink (b2): 2.4 μm additive: 0%; printing ink (b1): 0.1 μm additive: 3%.

EXAMPLES 2 TO 17

(a) The β-copper phthalocyanine pigment described in Example (1a) was dry-blended, as described in (1a), with the substances shown in Table I below, employed in the amounts shown in column 5.

(b) Toluene-based gravure printing inks were prepared from the mixtures obtained, using the method described in (A 1.1) and (A 1.2), and the abrasion produced by these inks was determined by method (A2). Column 6 of Table I shows the measured maximum abrasion.

EXAMPLE 18

Additives introduced during synthesis of the crude pigment (18.1) Copper phthalocyanine was prepared, by the method described in Ullmanns Encyklopädie der technischen Chemie, 4th revised and enlarged edition, 1979, Volume 18, pages 509/510, from phthalic anhydride, copper-II chloride and urea in trichlorobenzene in the presence of 2.6% by weight, based on phthalic anhydride, of zirconium oxide (99.9% pure $ZrO_2$; monoclinic; particle size <53 μm; "Tego BC 99S" from Th. Goldschmidt AG), and the product was worked up in a conventional manner.

The crude copper phthalocyanine was converted to a pigmentary form as described in Ullmann (loc. cit., page 512, left-hand column, 2nd paragraph from the bottom). The printing ink prepared from this pigment by the method described in (A 1.1) and (A 1.2) was tested, by method (A2), for abrasion produced.

Abrasion produced: 0.2±0.1 μm; Comparison: 0.6±0.3 μm (without additive).

(18.2) Copper phthalocyanine was prepared by the method of German Pat. No. 1,569,636, Example 1, from o-phthalodinitrile and copper-I chloride in nitrobenzene, with addition of 2.6%, based on o-phthalodinitrile, of zirconium oxide (90% of $ZrO_2$ and 9% of $SiO_2$; monoclinic; particle size <20 μm; "Zedox HC" from Anzon Ltd.), with thorough mixing. The crude pigment was converted to the pigmentary form as described in Example 18.1.

The gravure printing ink prepared with this pigment gave an abrasion of 0.2±0.1 μm when tested by method (A2).

EXAMPLE 19

Crude polychloro-copper phthalocyanine (containing 48.6% of Cl) was swollen for 20 hours in 95% strength sulfuric acid at 35°–40° C. and the mixture was then poured into a 7-fold amount of water. 3%, based on polychloro-copper phthalocyanine, of zirconium oxide (99.2% pure $ZrO_2$; monoclinic; particle size ≈3 μm; "Zircoa A" from Corning Glass Works) were added to the suspension, with thorough stirring. The green pigment was isolated in a conventional manner, and proved virtually non-abrasive, On testing a printing ink, prepared as described in (A 1.1) and (A 1.2), by method (A2) an abrasion of 0.2 μm was found. A gravure printing ink containing the comparative pigment (without zirconium oxide) gave an abrasion of 1.2 μm.

Corresponding results were obtained when the pigment was prepared by swelling chlorine-free or slightly chlorinated copper phthalocyanine or partially brominated copper phthalocyanine in 65–85% strength sulfuric acid and pouring the swollen material into water, and 1–3%, based on pigment, of the above zirconium oxide was added to the diluted sulfuric acid suspension.

EXAMPLE 20

A mixture of 100 parts of crude copper phthalocyanine, 2.5 parts of zirconium oxide (99.5% pure $ZrO_2$; monoclinic; particle size <53 μm; "Tego BC 99S" from Th. Goldschmidt AG), 400 parts of sodium chloride and 50 parts of polyethylene glycol was kneaded for 2 hours in a kneader. The batch was then digested in water in a conventional manner, and the pigment was isolated from the warm suspension and was dried. It

TABLE I

| Example | Additive | Hardness | Size [μm] | Amount [%] | Maximum abrasion [μm] |
|---|---|---|---|---|---|
| Comparison | 0 | — | — | — | 2.4 |
| 2 | magnesium oxide (MgO) | 5.5 | <3 | 1.75 | 1.6 |
| 3 | iron-II/III oxide ($Fe_3O_4$) | 5–7 | <1 | 3.0 | 1.5 |
| 4 | zirconium oxide (95% pure $ZrO_2$; cubic + monoclinic; "Zircoa C" from Corning Glass Works) | 6–7 | 3 | 2.0 | 1.15 |
| 5 | tin oxide ($SnO_2$) | 6 | <2 | 1.75 | 1.0 |
| 6 | Ceroxid (® Opaline from Rhone-Poulenc) | 7 | <1 | 2.0 | 1.0 |
| 7 | zirconium oxide (92% of $ZrO_2$ and 0.6% of $SiO_2$; cubic; "Zircoa B" from Corning Glass Works) | 6–7 | 3 | 1.8 | 0.9 |
| 8 | Jeweller's rouge ($Fe_2O_3$; iron-III oxide) | 5–6 | <1 | 2.5 | 0.76 |
| 9 | zirconium silicate ($ZrSiO_4$; "Zircosil 15" from Anzon Ltd.) | 7–8 | <3 | 3.0 | 0.58 |
| 10 | flint ($SiO_2$) | 7 | <3 | 1.0 | 0.48 |
| 11 | feldspar ($KAlSi_3O_8$) | 6–7 | <5 | 3.0 | 0.44 |
| 12 | steatite ($MgSiO_3$) | 7–8 | <5 | 2.0 | 0.36 |
| 13 | zirconium oxide (97% pure $ZrO_2$; cubic/monoclinic) | 6–7 | 4–7 | 1.5 | 0.22 |
| 14 | pumice | 6–7 | 5–25 | 5.0 | 0.18 |
| 15 | zirconium oxide (90% of $ZrO_2$ and 9% of $SiO_2$; monoclinic; "Zedox HC" from Anzon Ltd.) | 6–7 | 20 | 1.5 | 0.12 |
| 16 | zirconium oxide (99% pure $ZrO_2$;monoclinic; "Tego BC 99S" from Th. Goldschmidt AG) | 6–7 | 53 | 0.75 | 0.03 |
| 17 | carbonyl iron (Fe, containing 0.8% of C and 0.8% of N) | 7–8 | 3–5 | 3.0 | 0.01 | was converted to a gravure printing ink as described in (A 1.1) and (A 1.2) and the abrasion produced by the ink was determined by method (A2) and found to be 0.05 μm; a comparative ink (ie. without addition of zirconium oxide) gave an abrasion of 1.1 μm.

EXAMPLE 21

100 parts of abrasive copper phthalocyanine pigment (β-modification) and 3 parts of milled pumice (particle size <53 μm) were dry-milled as described in German Published Application DAS 1,161,533, Example 2, and the product was worked up.

A gravure printing ink prepared with the pigment thus obtained gave an abrasion of 0.15 μm when tested by method (A2). The comparative pigment, milled in the absence of pumice, gave an abrasion of 1.0 μm in a printing ink.

An equally good result was obtained with the mixture of crude pigment and pumice was dry-milled in a ball mill in the presence of sodium chloride, binder-compatible assistants and/or pigment additives, and the assistants, if any, were removed. After a solvent finishing treatment, the β-copper phthalocyanine pigments obtained also showed an abrasion of about 0.15 μm.

EXAMPLE 22

(a) 100 parts of crude abrasive copper phthalocyanine and 2 parts of zirconium oxide (99.0% pure $ZrO_2$, monoclinic, particle size <20 μm; "Zirkonoxid S grade" from Magnesium Electron Ltd.) were wet-milled as described in Example 1 of German Laid-Open Application DOS 2,160,208 and worked up.

The gravure printing ink prepared with this pigment as described in (A 1.1) and (A 1.2) produced an abrasion of 0.1 μm.

(b) In contrast, the printing ink prepared with the comparative pigment milled in the absence of zirconium oxide produced an abrasion of 1.3 μm.

(c) If the same amount of the zirconium oxide mentioned under (a) was added to the milled crude pigment from (b) before working up, a virtually non-abrasive pigment was obtained. The gravure printing ink prepared with this pigment gave an abrasion of 0.15 μm when tested by method (A2).

EXAMPLE 23

100 parts of a polychloro-copper phthalocyanine pigment (containing 45.2% of Cl), which is suitable for the preparation of gravure printing inks but is abrasive, and 1.5 parts of carbonyl iron powder (containing 0.8% of N and 0.9% of C; particle size ≈4 μm) were dry-blended. The gravure printing ink obtained as described in (A 1.1) and (A 1.2) gave an abrasion of 0.2 μm when tested by method (A2). The printing ink prepared without the addition of carbonyl iron powder gave an abrasion of 1.6 μm.

EXAMPLE 24

23 parts of a copper phthalocyanine pigment, which is suitable for the preparation of gravure printing inks but is abrasive, and 0.69 part of milled flint (particle size <50 μm) were converted to a gravure printing ink as described in (A 1.1) and (A 1.2). This ink, when tested by method (A2), gave an abrasion of 0.2 μm. The printing ink prepared in the absence of flint gave an abrasion of 0.7 μm.

EXAMPLE 25

(a) Milled feldspar was dispersed in a 50% strength solution of a gravure printing ink binder until the particle size was ≦20 μm. The shelf life of the paste was improved by adding bentonite.

(b) A concentrate (prepared as described in (A 1.1), which contained copper phthalocyanine pigment and gave a printing ink, by method (A 1.2), which produced an abrasion of 0.7 μm, was mixed with sufficient of the paste prepared as described in (a) to give a feldspar content of 2.5%, based on pigment. Dilution of this mixture as described in (A 1.2) gave a printing ink which produced an abrasion of 0.3 μm when tested by method (A2).

EXAMPLE 26

A very highly abrasive copper phthalocyanine was mixed with the substances shown in Table II. The mixtures were converted, as described in (A 1.1) and (A 1.2), to gravure printing inks, whose abrasion was determined by method (A2). The results obtained are shown in column 5 of the Table.

TABLE II

| | Additive | Hardness | Amount [%] | Maximum abrasion [μm] |
|---|---|---|---|---|
| a | 0 | — | — | 4 |
| b | ® Bentone 34 | 1 | 3.0 | 3.8 |
| c | zirconium oxide (99% pure $ZrO_2$; monoclinic; "Tego BC 99S" from Th. Goldschmidt) | 6.5 | 0.25 | 0.81 |
| d | Bentone 34 + zirconium oxide | 1.0 6.5 | 3.0 0.25 | 0.08 |

EXAMPLE 27

A very highly abrasive β-copper phthalocyanine pigment suitable for gravure printing inks was dry-blended with the amount of zirconium oxide (99% pure $ZrO_2$; monoclinic, particle size <53 μm; "Tego BC 99S" from Th.Goldschmidt AG) shown in Table III.

The mixtures thus obtained were converted to gravure printing inks as described in (A 1.1) and (A 1.2), and the abrasion of the printing inks was determined by method (A2).

TABLE III

| | a | b | c | d | e | f | g | h |
|---|---|---|---|---|---|---|---|---|
| Amount of zirconium oxide [%][1] | 0 | 5 | 1 | 0.75 | 0.5 | 0.25 | 0.1 | 0.05 |
| Maximum abrasion [μm] | 4 | 0.05 | 0.15 | 0.45 | 0.63 | 0.81 | 1.06 | 1.42 |

[1]based on pigment

EXAMPLE 28

Effect of particle size of the abrasion-reducing additives

A zirconium oxide (99% pure $ZrO_2$, monoclinic, particle size 53 μm; "Tego BC 99S" from Th. Goldschmidt AG) was separated into 3 particle size categories by sieving:

| Zirconium oxide | Particle size | |
|---|---|---|
| (a) | <5 μm | |
| (b) | 5–20 μm | |
| (c) | 20–53 μm | |
| (d) | <53 μm | (zirconium oxide used for sieving) |

A highly abrasive β-copper phthalocyanine pigment, together with 1.5%, based on pigment, of one of the zirconium oxides (a), (b) and (c) or of the zirconium oxide (d) used for sieving, or without added zirconium oxide, was converted to a gravure printing ink as described in (A 1.1) and (A 1.2).

Testing the abrasion by method (A2) gave the results shown in Table IV.

TABLE IV

β-Copper phthalocyanine pigment

| Additive | Particle size [μm] | Amount[1] [%] | Maximum abrasion [μm] |
|---|---|---|---|
| 0 | | | 2.4 |
| (a) ZrO$_2$ | <5 | 1.5 | 0.03 |
| (b) " | 5–20 | 1.5 | 0.1 |
| (c) " | 20–53 | 1.5 | 0.15 |
| (d) " | <53 | 1.5 | 0.3 |

[1]based on pigment

EXAMPLE 29

24 parts of a polychloro-copper phthalocyanine pigment which is tinctorially suitable for gravure printing of packaging materials but is abrasive were dispersed, together with 0.6 part of milled pumice, in 276 parts of a 30% strength solution of a polyamide resin in a 67:33 mixture of n-propanol and gasoline, by treatment with 300 g of steel balls in a vibratory mill for 30 minutes. The ink obtained was diluted with the same solvent mixture to a flow time of 28 sec in a DIN cup with 3 mm nozzle, and this ink was tested for abrasion by method (A2).

In a parallel test, the same pigment was converted to a printing ink without addition of pumice.

| Abrasion of the gravure printing ink without additive: | 1.44 μm |
|---|---|
| Abrasion of the gravure printing ink with additive: | 0.10 μm. |

EXAMPLE 30

25 parts of a nitrocellulose-containing formulation of slightly abrasive β-copper phthalocyanine (pigment content 50%) were stirred, together with 0.5 part (≙ 4%, based on pigment) of finely milled feldspar (particle size <53 μm), into 75 parts of a 9:1 mixture of ethanol and ethylene glycol monoethyl ether. This concentrate was then diluted in the ratio of 1:2 with a 25% strength solution of nitrocellulose in the above solvent mixture. The ink was diluted to a flow time of 28 sec, in a DIN cup with 3 mm nozzle, by addition of solvent mixture. The abrasion was determined by method (A2).

| Packaging gravure printing ink without additive: | 0.36 μm abrasion |
|---|---|
| Packaging gravure printing ink with additive: | 0.10 μm abrasion |

EXAMPLE 31

(a) 25 parts of a formulation of iron oxide hydrate (FeOOH) and a vinyl chloride/vinyl acetate copolymer, containing 1% by weight (based on pigment) of iron powder (Mohs hardness 7; particle size ≈4 μm) prepared from iron pentacarbonyl were introduced into 175 parts of a 12% strength solution of the above copolymer in a 1:1 ethyl acetate/methyl ethyl ketone mixture and the batch was stirred for 30 minutes with a high-speed stirrer. The concentrate was then mixed in the ratio of 1:1 with the same solution of the copolymer, and the ink was diluted to 28 sec flow time, measured in a DIN cup with 3 mm nozzle.

(b) For comparison, an ink was prepared from a similar formulation which did not contain any iron powder.

The inks were tested by method (A2):

| Packaging gravure printing ink without additive: | 0.5 μm abrasion |
|---|---|
| Packaging gravure printing ink with additive: | 0.15 μm abrasion |

A similar result to that given with the ink obtained by method (a) was achieved if 1% by weight, based on pigment, of the iron powder described under (a) was subsequently stirred into the ink or concentrate prepared as described in (b). Abrasion: 0.20 μm.

EXAMLE 32

0.45 part of zirconium oxide (containing 92% of ZrO$_2$ and 0.6% of SiO$_2$; cubic, particle size 3 μm; "Zircoa B" from Corning Glass Works) was added to 100 parts of a concentrate paste (containing 15 parts of C.I. Pigment Red 57:1, C.I. No. 15,850:1 in 85 parts of a 20% strength solution of a rosin-modified phenolic resin in toluene), which had become abrasive as a result of 10 hours' milling in an agitated ball mill, and the additive was dispersed.

The concentrate was then mixed with an equal quantity of a 50% strength solution of the same resin in toluene, and the ink was tested by method (A2).

For comparison, an ink was tested without addition of zirconium oxide.

| Abrasion without additive: | 0.7 μm |
|---|---|
| Abrasion with additive: | 0.2 μm. |

The same result was obtained if 3%, based on pigment, of the same zirconium oxide were added to the suspension of pigment and binder solution before milling.

EXAMPLE 33

3%, based on pigment, of finely milled steatite (particle size <5 μm) in the form of a suspension in a 50% strength solution of a rosin-modified phenolic resin in toluene were added to, and homogeneously dispersed in, 100 parts of a concentrate paste (containing 15 parts of Pigment Yellow 12, C.I. No. 21,090, in 85 parts of a 10% strength solution of the above resin in toluene), which had become abrasive as a result of 10 hours' milling in an agitated ball mill.

The paste was converted to a gravure printing ink which was diluted to the required viscosity and tested by method (A2). For comparison, a gravure printing ink was prepared without addition of steatite.

| Abrasion without additive: | 0.6 μm |
|---|---|
| Abrasion with additive: | 0.2 μm |

EXAMPLE 34

(a) 108 parts of a slightly abrasive β-copper phthalocyanine pigment suitable for decorative gravure printing inks and 2.2 parts of zirconium oxide (99% pure $ZrO_2$, monoclinic, particle size <20 μm; $ZrO_2$ S grade from Magnesium Electron Ltd.) were dispersed in a solution of 62.5 parts of casein in 187.5 parts of a 2:1 water-alcohol mixture on a vibratory mill, and the concentrate was diluted with the same casein solution to a flow time of 28 sec, measured in a DIN cup with 3 mm nozzle).

(b) For comparison, a printing ink was prepared from the same pigment, without addition of zirconium oxide. The inks were tested by method (A2).

| Abrasion without additive: | 0.5 μm |
|---|---|
| Abrasion with additive: | 0.2 μm. |

EXAMPLE 35

(a) A highly abrasive commercially available β-copper phthalocyanine pigment and 3% of zirconium oxide (containing 90% of $ZrO_2$ and ≈9% $SiO_2$; monoclinic, particle size <20 μm; "Zedox HC" from Anzon Ltd.) were homogeneously dry-blended.

A gravure printing ink was prepared with the resulting pigment, as described in (A 1.1) and (A 1.2).

(b) For comparison, a gravure printing ink was prepared from the same pigment without addition of zirconium oxide. Both inks were tested for abrasiveness by method (A2).

| Abrasion by ink (b), without additive: | 2.1 μm |
|---|---|
| Abrasion by ink (a), with additive: | 0.2 μm. |

The same result as in (a) was achieved if 3%, based on pigment, of the zirconium oxide used in (a) were subsequently incorporated into the gravure printing ink prepared as described in (b).

EXAMPLE 36

1.5%, based on solids, of the zirconium oxide fraction (a) described in Example 28 (particle size <5 μm), in the form of a 10% strength suspension in a 50% strength resin solution in toluene were added to a commercially available black gravure printing ink which contained carbon black as the pigment (size of primary particles ≈0.1 μm) and which was of medium abrasiveness. After mixing, the abrasion was determined by method (A2).

| Black gravure printing ink without additive: | 0.6 μm abrasion |
|---|---|
| Black gravure printing ink with additive: | 0.1 μm abrasion |

We claim:

1. An ink composition, comprising: a pigment and from 0.01 to 10% by weight, based on the pigment, of zirconium oxide which has a Mohs hardness of from 4.5 to 8.

2. The ink composition of claim 1, wherein said particulate zirconium oxide has a particle size less than 55 μm.

3. The ink composition of claim 2, wherein said particulate zirconium oxide has a particle size of from 0.1 to 20 μm.

* * * * *